United States Patent Office 3,525,566
Patented Aug. 25, 1970

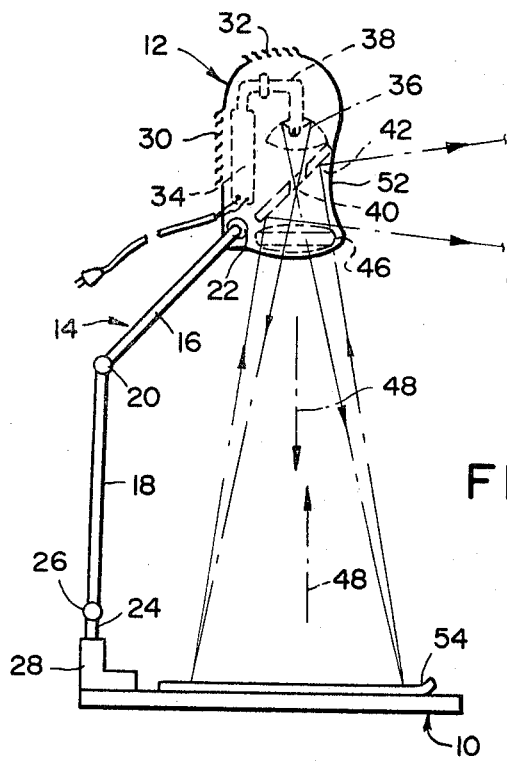
FIG. 1
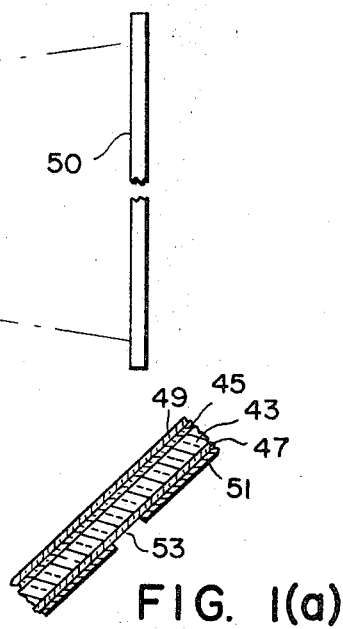
FIG. 1(a)
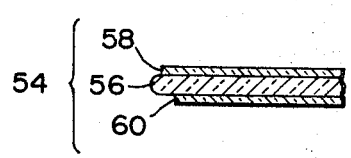
FIG. 2
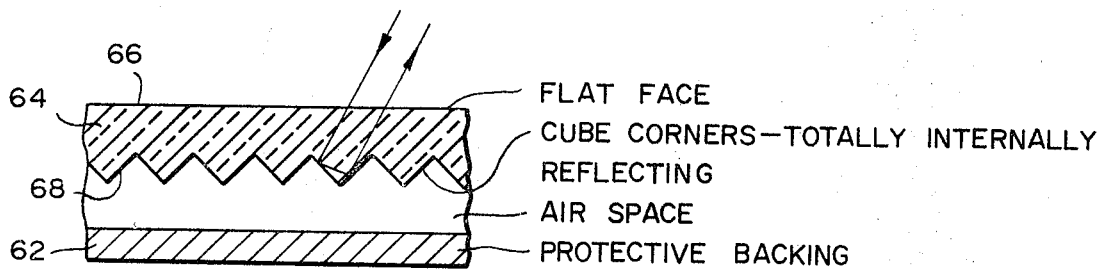
FIG. 3
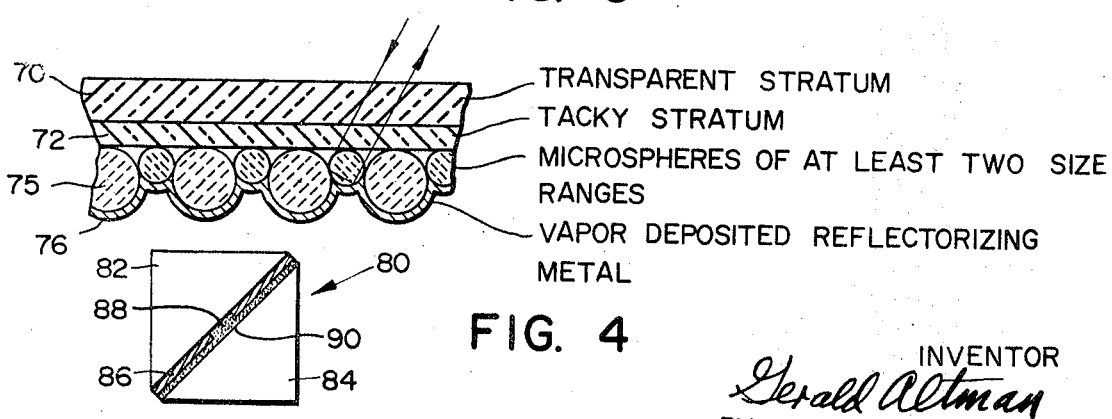
FIG. 4
FIG. 5

3,525,566
PROJECTION DEVICES AND GRAPHIC MATERIALS THEREFOR
Gerald Altman, 41 Westminster Road, Newton Center, Mass. 02159
Continuation-in-part of application Ser. No. 655,714, July 6, 1967. This application July 24, 1968, Ser. No. 747,339
Int. Cl. G03b 21/06, 21/14
U.S. Cl. 353—66
31 Claims

ABSTRACT OF THE DISCLOSURE

An optical projector for imaging a subject in terms of reflected light is provided with an array of optical elements at the subject, each with its own discrete optical axis, and a catadioptric illuminating and focusing system for controlling illuminating light directed to the subject and imaging light returned by the array. In one form, the transmission occurs through at least an aperture and the reflection occurs at a mirror interface surrounding the aperture. In another form, the light is reflected by a restricted mirror to the subject and is reflected by an extended mirror to the viewing screen.

RELATED APPLICATIONS

The present application is a continuation-in-part of patent application Ser. No. 655,714, filed on July 6, 1967, for Novel Projection Devices and Novel Graphic Materials Thereof, now abandoned.

BACKGROUND AND SUMMARY OF THE INVENTION

The present invention relates to optical projection and, more particularly, to episcopic (by reflection) projection onto a viewing screen of such subject matter as photographic prints ordinarily viewed directly, geometric contours of manufactured parts for quality control, overhead projection of transparent and opaque visual exhibits being presented, etc. In prior analogous systems, difficulties have been encountered in efficiently utilizing illumination originally available at the source.

A primary object of the present invention is to provide, for imaging a subject in terms of reflected light, a projection system comprising an array of optical elements at the subject, each with its own discrete optical axis, and a catadioptric illuminating and focusing system for controlling illuminating light directed to the subject and imaging light returned by the array. An array of optical elements having optical axes that are spaced from each other is a characteristic of a variety of reflex reflectors, including corner reflectors, refracting-reflecting microspheres and refracting-reflecting lenticules. In various forms, the catadioptric illuminating and focusing system includes a beam splitter for isolating the illuminating and imaging light from each other.

In one form, the beam splitter incorporates a beam control means which includes a relatively restricted optical control means and realtively extended optical control means, the filament of a lamp is focused on the relatively restricted optical control means, the reflex reflector is such as to spread an incident cone thereupon into a return cone, which overlaps the relatively extended optical control means for projection onto a viewing screen. In other words, the beam splitter serves to concentrate light from the source at a restricted area for direction toward the subject but to receive light from the subject at an extended area for proportion of the light returned to the beam splitter from the subject is lost.

Other objects of the present invention will in part be obvious and will in part appear hereinafter.

The invention accordingly comprises the devices and products involving the parts and components, which are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein:

FIG. 1 is a side view of an overhead projector embodying the present invention, with internal parts thereof shown in dashed lines;

FIG. 1(a) is a detail view of a modification of a component of the overhead projector of FIG. 1;

FIG. 2 is a cross sectional view of a transparency for use in connection with the overhead projector of FIG. 1;

FIGS. 3 and 4 illustrate certain advantageous reflex reflecting materials for use in the system of FIG. 1;

FIG. 5 is a detail view, with parts exaggerated for clarity, of another modification of a component of the overhead projector of FIG. 1;

DETAILED DESCRIPTION

Figure 6:
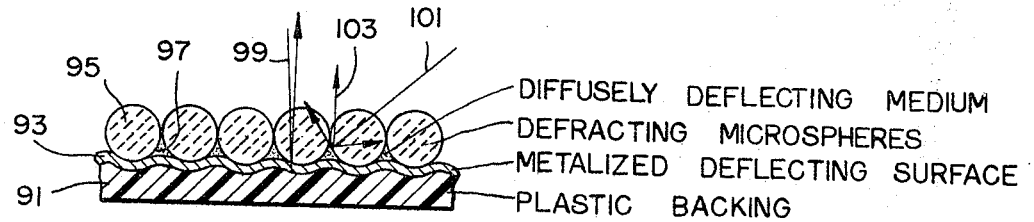
FIGS. 6 to 10 illustrate various other reflex reflecting materials for use in the system of FIG. 1.

Generally, FIG. 1 illustrates an overhead projector comprising a lower platform 10 having as a component thereof a reflex reflector of a type to be described below, an upper casing 12 for illuminating and projecting an image of a representation on lower platform 10 and a support 14 by which housing 12 may be adjustably positioned above platform 10. As shown, support 14 includes an upper section 16 and a lower section 18 pivoted at 20. The upper extremity of upper section 16 is pivoted to housing 12 as at 22. The lower extremity of lower section 18 is pivoted to a rod 24 as at 26. Rod 24 is rotatable within a seat 28 that extends upwardly from a bracket that is fixed to platform 10. In operation casing 12 may be adjustably located over platform 10 and fixed in position by means of knurled tightening nuts at universal pivots 22, 20 and 26.

Housing 12 generally supports and contains the illuminating and imaging components of the illustrated system, being provided with inlet vents 30 and outlet vents 32 through which air is circulated through the housing by a fan 34. Mounted within casing 12 is a lamp 36 having a base 38 by which it is positioned. Lamp 36 includes a glass envelope, the rearward surface of which is in the form of an elliptical mirror having a rearward focus and a forward focus. An incandescent filament is positioned at the rearward focus. Positioned at the forward focus is the central aperture 40 of a plane, front surface mirror 42, which is composed of heat resisting Pyrex glass. Axially aligned with the foci of the elliptical mirror of lamp 36 (and aperture 40 of mirror 42) is a symmetrical high speed lens 46. The arrangement is such that light generated at the filament of lamp 36 and directed through aperture 40 is condensed by lens 46 onto platform 10 along an axis 48. Then light, which is returned by a directive reflector (to be described) at platform 10 along axis 48, is projected by lens 46 and mirror 42 toward a suitable viewing screen 50 of the like. It will be noted that, in the vicinity of aperture 40, the conical envelope of light directed toward platform 10 is narrower than the conical envelope of light returned from platform 10. The directive reflector at platform 10 and/or lens 46 cooperate so that only a small portion of light returned from platform 10 is lost through aperture 40. Casing 12 is provided with an opening at 52 for the light directed to screen 50. In a modification, a suitable auxiliary projection lens is positioned at opening 52.

A preferred form of apertured mirror is shown in FIG. 1(a) as including a flat solid glass plate having, at opposite faces, antireflection strata 45, 47 for visible light. At the rear of the plate, in contiguity with stratum 45, is a reflection stratum 49 for infra-red radiation by which heat absorption and transmission from lamp 36 is reduced. At the front of the plate, in contiguity with stratum 47 is a reflecting coat of silver or aluminum 51 having an aperture 53, the dimensions of which can be precisely controlled for optimum relationships with the illuminating and imaging radiation.

In the form shown, platform 10 is provided with a directive reflector and the representation to be imaged on the screen is in form of a transparency 54, which is positioned upon platform 10. Transparency 54, as is shown in FIG. 2, is composed of a transparent plastic 56, composed for example of ethylcellulose, the opposite faces 58, 60 of which are provided with an antireflection film. Platform 10 may take any of the several forms of reflex reflecting means described below. Alternatively, platform 10 simply may be a non-reflective support and transparency 54 may be replaced by a flexible or an inflexible sheet having a reflex reflecting stratum of one of the types described below.

The reflex reflecting sheet of FIG. 3 includes a lower base 62, composed of a protective metal or the like and an upper reflex reflecting stratum 64 composed of plastic. Reflex reflecting stratum 64, which is composed for example of methyl methacrylate or some other optically clear polymer having an $N_D$ greater than 1.5, is positioned above base 62 by suitable spacers (not shown) by which an air gap is established between base 62 and stratum 64. Stratum 64 has an upper flat face 66 and a lower embossed face 68 with a cube corner distribution therein. The arrangement is such that an incident ray penetrating through upper face 66 is totally internally reflected by cube corner distribution 68 so that it returns in a direction that generally is opposite to its original direction of incidence.

The reflex reflecting sheet of FIG. 4 comprises a forward plastic stratum 70, composed of a flexible transparent polymer such as ethyl cellulose, a permanently tacky elastomeric adhesive 72, a multiplicity of optically clear refracting microspheres 75 and a metal coating 76. As will be observed, microspheres 75 are essentially of two size ranges. This sheet is produced by first sprinkling the larger microspheres on to the permanently tacky base in such a way that the maximum number adhere. Thereafter the smaller microspheres are sprinkled onto the permanently tacky base in order to ensure dense packing. Finally, the rearward surfaces of all of the microspheres are provided with an aluminum or silver coat by such means as vacuum deposition.

FIG. 5 illustrates another modification of mirror 42 in the form of a transmitting-reflecing cube 80 fabricated from two right angle equilateral prisms 82, 84 having like indices of refraction, $N_D$, of 1.5. At the hypotenuse of prism 82 is a reflecting metallic coat 86 having a central aperture 88. The hypotenuse of prism 84 is bonded to this reflecting metallic coat by a cement 90, such as Canadian balsam having an index of refraction, $N_D$, of 1.5. This cement fills aperture 88 so that, as a practical matter, the optical path from prism 82 through aperture 88 to prism 84 constitutes an optical continuum with an index of refraction, $N_D$, of 1.5. Since the optical resolution under given conditions is greater in a high index medium than in a low index medium, aperture 88 can be designed to be of smaller diameter than otherwise since its numerical aperture, which is directly proportional to the index of refraction, is larger than otherwise. In another modification, a like high numerical aperture in a high index medium is established between two oblique plates, one having an apertured reflecting coat and the other being bonded thereto by a like index cement to provide an optical continuum through the aperture.

The reflex reflecting stratum of FIG. 6 comprises a deformable plastic backing 91, the forward surface of which is metallized with a highly reflective aluminum or silver coat 93. Adhering to reflective stratum 93 is a layer of microspheres 95, which are suitably bonded to reflecting stratum 93 and which are impressed into reflecting stratum 93 by suitable means such as pressure rollers. The resulting structure is such that the rearward central position of each microsphere is in effect coated contiguously with a reflecting increment of reflecting stratum 95. At the interstices 97 between microspheres 95 and reflecting stratum 93, are provided a dispersion of minute particles of such a material as titanium dioxide. The arrangement is such that a ray of light 99 incident on the assemblage within a small solid angle approximating 90 degrees is reflex reflected. However, a ray of light 101 incident at a considerably larger angle tends to be intercepted by the diffusing medium within an interstice 97 so that diffuse reflection 103 results. In other words random light coming from directions substantially other than normal produces on the eye of an observer the effect of a matte white surface whereas light incident on the assemblage at approximately normal is relex reflected.

Figure 7:
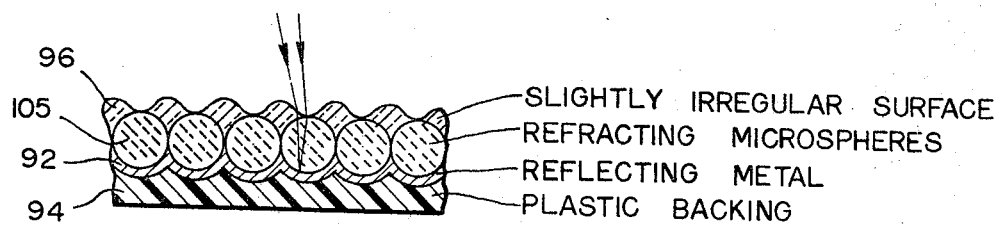

FIG. 7 illustrates a reflex reflecting material in which refracting microspheres 105, backed by a metallic reflecting metal 92 and disposed on a suitable plastic support stratum 94, are masked by a somewhat irregular surface 96. Irregular surface 96 serves to slightly randomize the return path of incident light in such a way that the return cone falls within a broader than ordinary solid angle. The arrangement is a predetermined compromise between reflex reflectivity and diffuse reflectivity.

Figure 8:
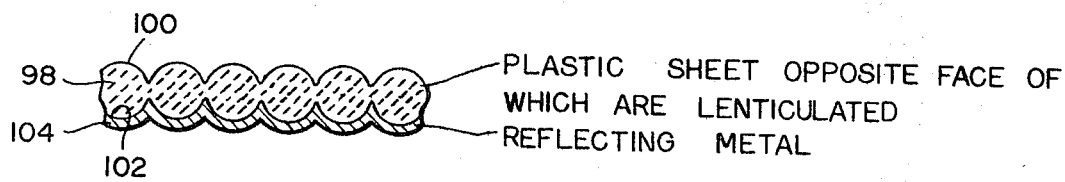

The reflex reflector of FIG. 8 is shown as including a plastic sheet 98 at opposite surfaces of which are provided lenticular lenses 100 and 102. The forward lenses 100 serve to refract incident light and the rearward surfaces 102, which are backed by a suitable metallic reflector 104, serve to return light along substantially the path of incidence. By varying the shape of lenticular surfaces 100, 102 from spherical to either parabolic or elliptical, different deviations from perfect reflex reflection are determined as desired.

Figure 9:
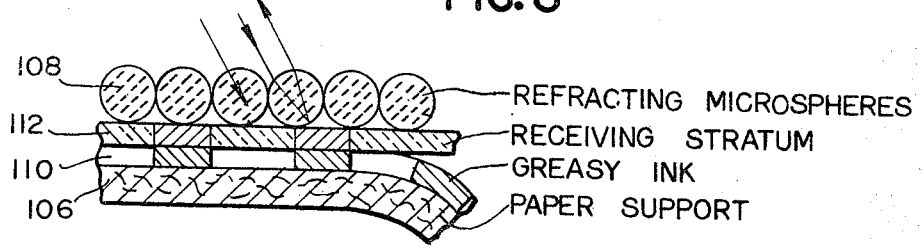

FIG. 9 illustrates a reflex reflecting material comprising a matte white paper backing 106, the forward face of which is covered with refracting microspheres 108. It will be observed that at the interface between support stratum 106 and microsphere stratum 108 are two superposed printed matter strata 110, 112. Printed matter stratum 110 initially merely constitutes the greasly ink of newsprint or the like. Printed matter stratum 112 initially includes a non-drying mixture, for example an organic solvent and latex. When stratum 112 and stratum 110 are pressed into intimate superposition, the greasy ink from stratum 110 migrates into the non-drying mixture of stratum 112. In consequence, the under surfaces of microspheres 108 are differentially associated with regions of light absorbing greasy ink and regions that are clear. The result is an enhanced reflection technique by which ordinary printed sheets may be projected with improved efficiency.

Figure 10:
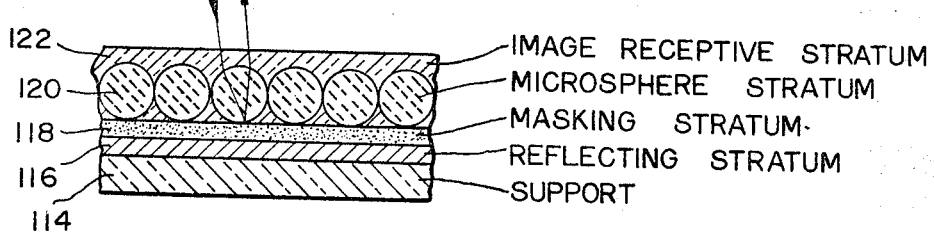

The reflex reflecting sheet of FIG. 10 includes, in laminated sequence, a base 114, a reflecting metallized stratum 116, a masking stratum 118, a microsphere stratum 120, and a print receptive stratum 122. Masking stratum 118 serves selectively to control the appearance of print receptive stratum 122 as viewed directly. In one form, masking stratum 118 contains a fluorescent dye such as betamethyl umbelliferone, which fluoresces in ambient light to provide a white matte background appearance for print receptive stratum 122 when viewed directly. In another form, masking stratum 118 contains a low melting microcrystalline material, for example, a hydrocarbon wax having a melting point about 50° F. above room temperature, that provides a milky white appearance when solid at room temperature and a clear transparent character when heated above its relatively low melting point. In one form, print receptive stratum is a photographic material selected from the class consisting of silver halide material, ferric material, diazo material, bichromated material, photopolymerizable material, photothermographic material, phototropic material and electroscopic material. When the product of FIG. 9 is being used in projection, a light ray on print receptive stratum 122 is reflex reflected by the combined operation of microsphere stratum 120 and reflecting stratum 116. If masking stratum is merely fluorescent, it does not unduly attenuate light ray 122. If masking stratum constitutes a microcrystalline wax, the product is heated above the melting point of the wax so that the masking stratum becomes transparent. When print receptive stratum 122 is viewed directly at room temperature, the masking stratum, as indicated above, serves to enhance a matte white appearance of the background. The association of photographic stratum and low melting microcrystalline material constitutes a product in itself that is useful in the absence of a microsphere stratum as a presentation that is opaque for direct viewing at room temperature and transparent for diascopic projection above room temperature.

Figure 11A:
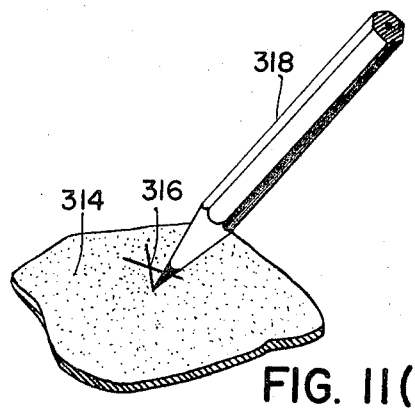
FIG. 11(a) illustrates a product, embodying the present invention, for use in connection with the overhead projector of FIG. 1.
Figure 11B:
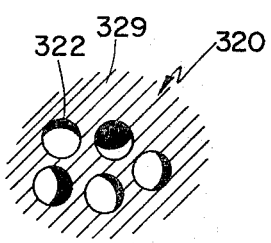
FIG. 11(b) is a greatly magnified view of a component of the product of FIG. 11(a)

In a modification of the embodiment of FIG. 1, transparency 54 is replaced by an opaque reflex reflecting sheet that is disposably carried by its support. This sheet, as shown in FIG. 11, may be replaced by a black sheet 314, which as a practical matter returns no light to beam splitter 232 but which is used in the following way. As shown in FIG. 11(a) in accordance with the present invention, a mark 316 may be imprinted on black paper 314 by a novel marker 318 in the form of a pencil having a particular pigment. This pigment is shown at 320 in FIG. 11(b) as comprising a multiplicity of reflex reflecting microspheres 322 dispersed in an optically clear, waxy matrix 329. Each of microspheres 322 is hemispherically clear and hemispherically coated with an inner metallic and outer pigmented interface. Waxy material 329 is a typical hydrocarbon of sufficient molecular weight to provide a minimum degree of self support and sufficiently low cohesion to provide easy frictional separation from a remaining mass. Mark 316, when projected by the opaque projector of FIG. 11, is such as to produce a bright image of the mark against a dark background on the viewing screen. In a modification of the product of FIG. 14, the pigment of FIG. 11(b) is incorporated in an elongated strip for use in typewriters or the like or a matrix sheet of the carbon paper type, either of which is capable of locally depositing reflex reflecting microspheres when locally subjected to a character forming impact.

Figure 12:
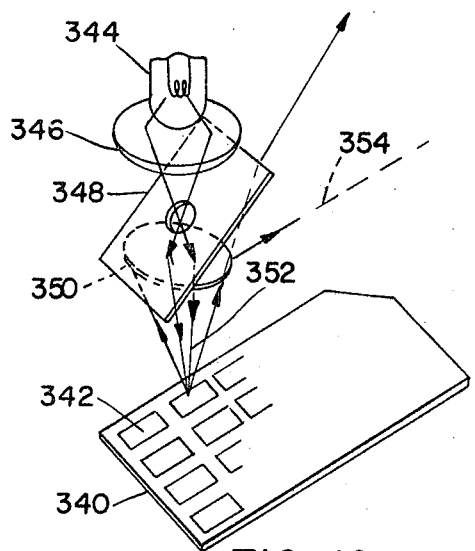
FIG. 12 illustrates components of an alternative system embodying the present invention.

FIG. 12 illustrates a system for projecting any of a sequence of micro-photographs 342 on a reflex reflecting data processing card 340. The reflex reflecting structure of card 340 corresponds to that described elsewhere herein and the micro-photographs are produced in a suitable photographic stratum produced by silver halide or another wet or dry chemical process. An image is produced by light from an incandescent or fluorescent source 344 which is directed by a collimator 346 through an aperture in beam splitter 348 for focusing by a condenser 350 onto one of micro-photographs 342. The converging beam 352 toward data processing cord 340 is returned by reflex reflecting micro-photograph 142 and reflected by beam splitter 348 as a diverging beam 354 toward a viewing screen or the like.

Figure 13:
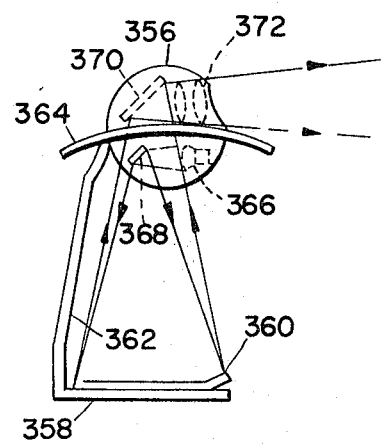
FIG. 13 illustrates an alternative projector of the present invention.

The overhead projector of FIG. 13 comprises an upper housing 256 containing optical projection and illumination components and lower platen 358 for supporting a reflex reflecting sheet 360, the housing being supported above the platen by a post 362. A shade 364, which extends outwardly in all directions from housing 356, is provided to shield the eyes of a user from light reflected by reflex reflecting sheet 360. Shade 364, for example, is composed of a tinted plastic sheet which absorbs in excess of 75% of all light directed through it.

The operating components within housing 356 include a source of illumination 366 having an incandescent filament and an ellipsoidal mirror, at one of the foci of which the incandescent filament is positioned. Also included are: a small 45° mirror 368 which is positioned at the other of the foci of the ellipsoidal mirror for directing illuminating light to reflex reflecting sheet 360; an upper 45° mirror 370, which is substantially larger than lower 45° mirror 368, for deflecting imaging light returned by reflex reflecting sheet 360; and an objective lens system 372 for projecting such imaging light onto a viewing screen or the like. The arrangement is such that the angle subtended by the cone of illuminating light at mirror 368 is considerably larger than the angle subtended by the cone of imaging light at mirror 370. In other words, the cross sectional area of the cone of illuminating light at mirror 368 is considerably less, say at most approximately one tenth of the cross sectional area of the cone of imaging light at mirror 368 so that little imaging light is lost at mirror 368.

Figure 14:
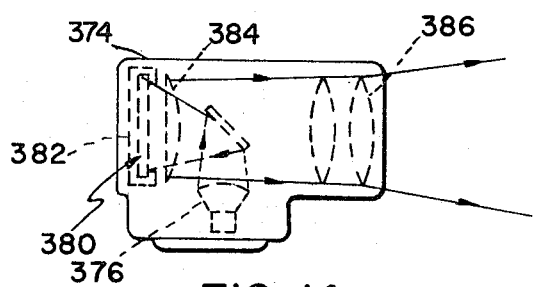
FIG. 14 illustrates another alternative projector of the present invention.

The projector of FIG. 14 is shown as comprising a housing 374, within which the operating components are affixed and contained. These operating components include an illumination source 376 in the form of an incandescent lamp having an incandescent filament and a reflector which is ellipsoidal in configuration. The incandescent filament is located at one of the foci of the ellipsoidal reflector. At the other of the foci of the ellipsoidal reflector is a 45° mirror 378 by which light generated by lamp 376 is deflected along an axis toward reflex reflecting or specular presentation 380, which is carried by a suitable holder 382. In the path between mirror 378 and representation 380 is a lens 384, which is contiguous with presentation 380 and which collimates light deflected from lamp 376 by 45° mirror 378. This illuminating light is returned by representation 380 as imaging light which is directed toward an objective lens 386 for projection onto a viewing screen. It will be noted that the cross sectional area of the imaging light in the vicinity of mirror 378 is greater than the cross sectional area of the illuminating light in the vicinity of mirror 378 so that little imaging light is lost by reflection at mirror 378. Generally, the cross sectional area of the imaging light in the vicinity of mirror 378 is at least 10 times as great as the cross sectional area of the illuminating light in this vicinity.

The present invention thus provides a variety of episcopic projection techniques of improved efficiency and versatility. Since certain changes may be made in the foregoing disclosure without departing from the present invention, it is intended that all matter described in the foregoing specification and shown in the accompanying drawings be interpreted in an illustrative and not in a limiting sense.

What is claimed is:

1. An optical projector comprising positioning means defining an optical axis between a light source means and a support means for a presentation, a mirror having an aperture, said mirror being disposed substantially along a surface intersecting said axis substantially at 45° with said aperture on said axis, lens means on said axis for condensing said radiation as directed through said aperture within a first envelope, and directive reflective means in contiguity with said presentation for establishing in cooperation with said lens means a second envelope for projection via said mirror, said directive reflective means being reflex reflecting.

2. An optical projector comprising positioning means defining an optical axis between a light source means and a support means for a presentation, a mirror having an aperture, said mirror being disposed substantially along a surface intersecting said axis substantially at 45° with said aperture on said axis, lens means on said axis for condensing said radiation as directed through said aperture within a first envelope, and directive reflective means in contiguity with said presentation for establishing in cooperation with said lens means a second envelope for projection via said mirror, said directive reflective means being constituted by a distribution of cube corners characterized by total internal reflection.

3. An optical projector comprising positioning means defining an optical axis between a light source means and a presentation support means for a presentation, a mirror having an aperture, said mirror being disposed substantially along a surface intersecting said axis substantially at 45° with said aperture on said axis, lens means on said axis for condensing said radiation as directed through said aperture within a first envelope, and directive reflective means in contiguity with said presentation for establishing in cooperation with said lens means a second envelope for projection via said mirror, said directive reflective means being constituted by a distribution of minute refracting spheres of different size ranges.

4. An optical projector comprising positioning means defining an optical axis between a light source means and a support means for a presentation, a mirror having an aperture, said mirror being disposed substantially along a surface intersecting said axis substantially at 45° with said aperture on said axis, lens means on said axis for condensing said radiation as directed through said aperture within a first envelope, and directive reflective means in contiguity with said presentation for establishing in cooperation with said lens means a second envelope for projection via said mirror, said lens means being substantially symmetrical and high speed, said directive reflecting means being reflex reflecting.

5. An overhead projector comprising a light source, presentation support means for a presentation, positioning means defining an optical axis between said light source and said presentation support means, a deflecting mirror having an aperture, said deflecting mirror being disposed substantially along a surface intersecting said axis at approximately 45° with said aperture on said axis, and a focusing mirror for concentrating illuminating light from said light source for transmission through said aperture in order to generate a substantially conical envelope of said illuminating light directively diverging toward said support means, portions of said mirror surrounding said aperture deflecting a substantially conical envelope of imaging light directively converging from said support means, and lens means for projecting an image of said presentation onto a viewing screen in terms of said substantially conical envelope of imaging light, said imaging light directively converging from said support means being under the control of reflex reflecting means at said support means, said substantially conical envelope of illuminating light being narrower than said substantially conical envelope of imaging light in the vicinity of said aperture.

6. The overhead projector of claim 5 wherein said source mirror is ellipsoidal with two foci, said light source being at one of said foci and said aperture being at the other of said foci.

7. The overhead projector of claim 5 wherein a multiplicity of corner reflectors control the optical relationships between said substantially conical envelope of imaging light at said presentation support means.

8. The overhead projector of claim 5 wherein a multiplicity of refracting spheres control the optical relationships between said substantially conical envelope of illuminating light and said substantially conical envelope of imaging light at said presentation support means.

9. A projector comprising source means for providing radiation to support means for visual subject means, mirror means for interposition optically between said source means and said support means, said mirror means being provided with at least an aperture therethrough, focusing means for directing said radiation through said aperture in the direction of said support means, and objective means for imaging such visual subject means on viewing screen means in terms of said radiation returned from said visual subject means and reflected by said mirror means, radiation return means being associated optically with said visual subject means at said support means, said radiation return means including reflex reflecting means.

10. An overhead projector comprising source means for providing illuminating light, support means for a visual subject, said light being directed toward said support means substantially along an axis, mirror means interposed optically between said source means and said support means at an angle with respect to said axis, said mirror means being provided with aperture means therethrough, focusing means for directing said light from said source means through said aperture means along said axis toward said support means, and projection lens means for imaging said visual subject on viewing screen means in terms of said light returned from said support means and reflected by said mirror means, said light diverging substantially along said axis from said aperture means toward said support means and said light converging substantially along said axis from said support means toward said mirror means, said light converging from said support means being spread with respect to said light diverging toward said support means, radiation return means being optically associated with said visual subject at said support means, said radiation return means including reflex reflecting means.

11. An overhead projector comprising source means for providing illuminating light, support means for a visual subject, said light being directed toward said support means substantially along an axis, mirror means interposed optically between said source means and said support means at an angle with respect to said axis, said mirror means being provided with aperture means therethrough, focusing means for directing said light from said source means through said aperture means along said axis toward said support means, and projection lens means for imaging said visual subject on viewing screen means in terms of said light returned from said support means and reflected by said mirror means, said light diverging substantially along said axis from said aperture means toward said support means and said light converging substantially along said axis from said support means toward said mirror means, the solid angle subtended by said light converging from said support means being smaller than the solid angle subtended by said light diverging toward said support means, a multiplicity of minute reflex reflecting elements being optically associated with said visual subject at said support means.

12. An optical projector for imaging a subject episcopically on a viewing means, said optical projector comprising directive light source means, transmitting-reflecting means and objective means, said transmitting-reflecting means transmitting light from said source means and receiving light from said subject along a substantially common axis, said transmitting-reflecting means having relatively extended mirror means and relatively restricted aperture means through said mirror means, said mirror means being disposed at an angle with respect to said common axis, said source means being arranged with respect to said aperture means for concentrating illuminating light at said aperture means, reflex reflecting means for returning and spreading imaging light from said subject, said objective means being arranged with respect to said mirror means for focusing said imaging light, deflected by said mirror means, on said viewing means.

13. The optical projector of claim 12 wherein said aperture means is established by a transparent solid medium having interfaces coated with antireflection means.

14. The optical projector of claim 12 wherein said aperture means is defined within a solid optical component.

15. An optical projector for imaging a visual representation on a viewing screen, said optical projector comprising source means for providing illuminating light, focusing means communicating with said source means for concentrating a beam of illuminating light at a restricted region in space, beam control means presenting relatively restricted optical means and relatively extended optical means, and reflex reflecting means at said visual representation, said restricted optical means directing said beam of illuminating light from said source means to said visual representation along a given axis, said reflex reflecting means returning a beam of imaging light from said visual representation to said extended optical means along said given axis, means causing said beam of imaging light in the vicinity of said restricted optical means to be less concentrated than said beam of illuminating light in said vicinity, said beam of imaging light being directed by said extended optical means for focusing on said viewing screen.

16. The optical projector of claim 15 wherein said extended optical means is constituted by a mirror and said restricted optical means is defined by an aperture in said mirror.

17. An optical projector comprising positioning means defining an optical axis between a light source means and a support means for a visual presentation, a relatively restricted mirror on said axis at an oblique orientation with respect thereto for directing illuminating light from said light source means along said axis to said visual presentation, a reflex reflecting means in coextensive contiguity with said visual presentation for returning imaging light along said axis, means causing said imaging light to be spread relative to said illuminating light in the vicinity of said relatively restricted mirror, and objective means for projecting said imaging light onto a viewing screen.

18. The optical projector of claim 17 wherein said reflex reflecting means is extended in relation to said relatively restricted mirror so that said illuminating light is enveloped by a diverging cone and so that said imaging light is enveloped by a converging cone.

19. The optical projector of claim 17 wherein said reflex reflecting means includes a plurality of forward convex refracting means and a plurality of rearward concave reflecting means.

20. The optical projector of claim 17 wherein said reflex reflecting means includes a plurality of corner reflectors.

21. An optical projector comprising positioning means defining an optical axis between a light source means and a support means for a visual presentation, a relatively restricted mirror on said axis at an oblique orientation with respect thereto for directing illuminating light from said light source means along said axis to said visual presentation, a reflex reflecting means in coextensive contiguity with said visual presentation for returning imaging light along said axis, means causing said imaging light to be spread relative to said illuminating light in the vicinity of said relatively restricted mirror, a relatively extended mirror on said axis at an oblique orientation with respect thereto for directing imaging light from said reflex reflecting means toward a viewing screen, and objective means for projecting said imaging light onto a viewing screen.

22. The optical projector of claim 21 wherein said reflex reflecting means is extended in relation to said relatively restricted mirror so that said illuminating light is enveloped by a diverging cone and so that said imaging light is enveloped by a converging cone.

23. The optical projector of claim 21 wherein said reflex reflecting means includes a plurality of foreward convex refracting means and a plurality of rearward concave reflecting means.

24. The optical projector of claim 21 wherein said reflex reflecting means includes a plurality of corner reflectors.

25. An optical projector for producing an image of a visual representation on a viewing screen, said optical projector comprising source means for producing illuminating light, focusing means for concentrating said illuminating light at a first region spaced from said source means, said illuminating light being directed without substantial reflection along a given optical axis toward said visual representation from said first region, directive reflector means coextensive with said visual representation, said illuminating light being converted to imaging light on return from said directive reflector means, said directive reflector means concentrating said imaging light along said given optical axis at a second region in contiguity with said first region, isolation means optically communicating with said first and second region for separating said illuminating light and said imaging light from each other, and refracting means for projecting said image of said visual representation in terms of such light, said directive reflector means including a plurality of optical elements, each optical element of said plurality having an optical axis that is spaced from the optical axes of other optical elements of said plurality.

26. The optical projector of claim 25 wherein said directive reflector means is substantially reflex reflecting.

27. The optical projector of claim 25 wherein said plurality of optical elements are corner reflectors.

28. The optical projector of claim 25 wherein said plurality of optical elements are refracting-reflecting microspheres.

29. The optical projector of claim 25 wherein said plurality of optical elements are refracting-reflecting lenticules.

30. The optical projector of claim 25 wherein said isolation means includes mirror means for deflecting said imaging light toward said viewing screen.

31. An optical projector for producing an image of a visual representation on a viewing screen, said optical projector comprising source means for producing illuminating light, focusing means for concentrating said illuminating light along a given optical axis at a first region spaced from said source means, said illuminating light being directed toward said visual representation from said first region, directive reflector means in contiguity with said visual representation, said illuminating light being converted to imaging light on return from said directive reflector means, said directive reflector means concentrating said imaging light along said given optical axis at a second region in contiguity with said first regon, isolation means optically communicating with said first and second region for separating said illuminating light and said imaging light from each other, and refracting means for projecting said image of said visual representation in terms of such light, said directive reflector means including a plurality of optical elements, each optical element of said plurality having an optical axis that is spaced from the optical axis of other optical elements of said plurality.

References Cited

UNITED STATES PATENTS

| | | | |
|---|---|---|---|
| 1,763,482 | 6/1930 | Scheppmann | 178—7.1 |
| 2,167,149 | 7/1939 | Grote | 350—103 X |
| 2,294,930 | 9/1942 | Palmquist | 350—103 X |
| 2,944,463 | 7/1960 | Rantsch | 350—152 X |
| 3,277,782 | 10/1966 | Smith | 350—147 X |
| 3,285,126 | 11/1966 | Lucas | 353—38 X |
| 3,293,982 | 12/1966 | Appledorn | 353—38 |
| 3,310,900 | 3/1967 | Hamilton et al. | 350—105 X |
| 3,340,765 | 9/1967 | Herriott | 353—38 |
| 3,368,448 | 2/1968 | Guttmann. | |

FOREIGN PATENTS 43,130    5/1966    Germany.

NORTON ANSHER, Primary Examiner

R. M. SHEER, Assistant Examiner

U.S. Cl. X.R.

353—38